United States Patent [19]
Allen

[11] 3,710,999
[45] Jan. 16, 1973

[54] AUTOMOBILE CARRIER
[76] Inventor: Richard A. Allen, Bowles Terrace, Lincoln, Mass. 01773
[22] Filed: Nov. 5, 1970
[21] Appl. No.: 87,084

[52] U.S. Cl..........................224/42.03 B, 224/29 R
[51] Int. Cl..............................................B60r 19/02
[58] Field of Search..224/42.03 R, 42.03 A, 42.03 B, 224/29 R, 42.1 R, 42.1 E, 42.1 F, 42.1 G

[56] References Cited

UNITED STATES PATENTS

| | | | |
|---|---|---|---|
| 3,437,248 | 4/1969 | Allen | 224/42.03 R |
| 3,204,839 | 9/1965 | Yuda et al. | 224/42.1 R |
| 3,349,977 | 10/1967 | Caminiti | 224/42.1 E |
| 3,203,604 | 8/1965 | Spence | 224/42.1 E |
| 2,585,231 | 2/1952 | Dorsey | 224/42.46 X |

Primary Examiner—Gerald M. Forlenza
Assistant Examiner—John Mannix
Attorney—Mevin E. Frederick

[57] ABSTRACT

A carrier for carrying many different types of objects on an automobile, truly universal by reason of its ready and simple adaptability for removable attachment to the rear portion of substantially any automobile whether it be a domestic or foreign station wagon, sedan, square back, compact, or the like, comprising two generally L-shaped side members, an outwardly extending carrying member adapted for attachment to each side member, and a generally U-shaped cross piece adapted for attachment to the side members and the carrying members, and a second cross piece adapted for attachment to the side members remote from the U-shaped member.

10 Claims, 9 Drawing Figures

PATENTED JAN 16 1973 3,710,999

RICHARD A. ALLEN
INVENTOR.

BY Melvin E. Fredereck

ATTORNEY

RICHARD A. ALLEN
*INVENTOR.*

BY *Melvin E. Frederick*

ATTORNEY

RICHARD A. ALLEN
*INVENTOR.*

BY *Melvin E. Frederick*

ATTORNEY

AUTOMOBILE CARRIER

This invention relates to carriers for carrying articles such as bicycles, trash barrels, skiis, luggage and other articles, typically, on the rear of an automobile.

Because of the popularity of bicycle riding, both as a competitive sport and as a means of relaxation and exercise, there has existed, almost since the advent of the automobile, a need for a universal automobile carrier which enables a bicycle owner to simply and conveniently transport his bicycle, motorized bicycle or the like from place to place by means of his automobile irrespective of the design and configuration of the automobile. Further, quite often the need arises for carrying luggage, trash barrels, skiis, or other similar awkward articles on an automobile. This requirement is more usually found on compact automobiles, especially of foreign manufacture due to their limited interior and luggage space, than on full-sized American automobiles. Some attempts have been previously made to provide carriers or racks for carrying articles of the type identified above as well as racks specifically intended for carrying only bicycles. See, for example, U.S. Pats. issued to Karl, No. 3,203,605; Yuda, No. 3,204,839; Donnelley, No. 2,512,267.

Due to interference with the forward view of the driver and the greater possibility for damage, carriers and racks of the type here concerned are normally mounted on the rear of the automobile. Usually, when any of the previous carriers or racks are mounted on the rear, they restrict, if not completely exclude, access to the engine or trunk compartment. A particular disadvantage of such carriers and racks is that they are not adaptable to use on any automobile irrespective of its design or configuration. For an automobile rack not subject to the disadvantages of prior art carriers and racks with the exception that its maximum utility is attained only when attached to a single type of automobile, see my U.S. Pat. No. 3,437,248.

A carrier in accordance with the present invention overcomes the problems with previous luggage racks including the carrier shown and described in my U.S. Pat. No. 3,437,248. Use of a carrier in accordance with the present invention is not limited to carrying only one or specific types of awkward articles; it can be used to carry bicycles simply, conveniently, and easily; it can with equal facility be used to carry a plurality of trash barrels, skiis, and the like; it can serve as a frame on which luggage can be hung or tied; it may be attached in such a position as to not block the view of taillights or number plates or access to an engine or trunk compartment; and, in addition to all of the above-noted advantages, it not only may be assembled by a child, but easily installed on and removed from substantially any automobile irrespective of the design, configuration, or place of manufacture of the automobile.

Other objects, advantages and features of the invention will be more clearly understood from the following detailed description of a preferred embodiment and the accompanying drawings in which.

Figure 3:
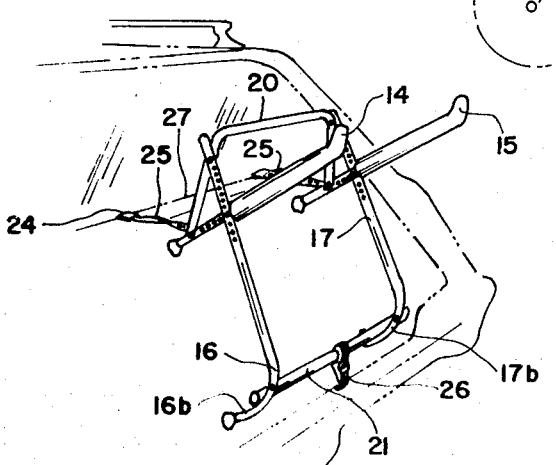
FIG. 3 is a perspective view of the invention showing it attached to the rear door at the lower portion of the window opening of a typical station wagon, the station wagon being shown in phantom.
Figure 8:
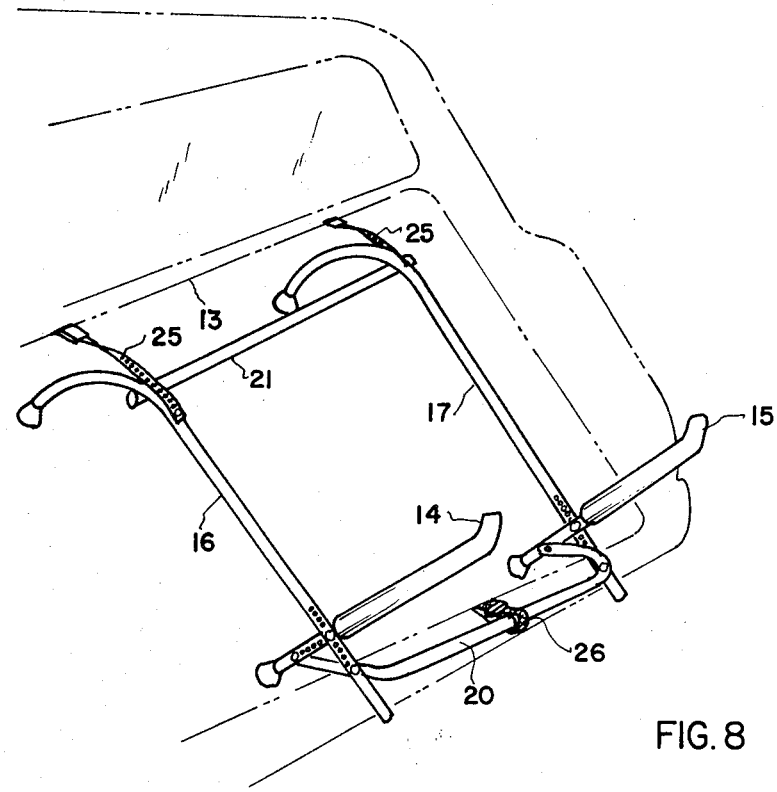
Figure 7:
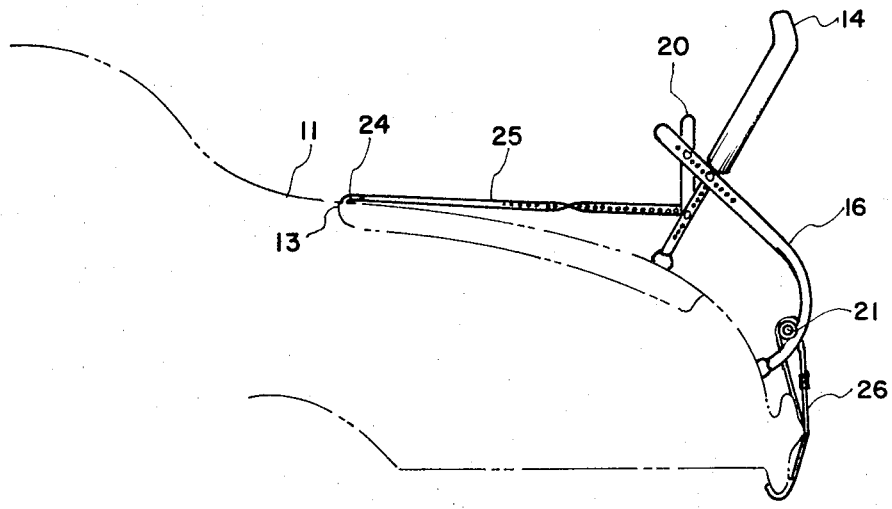

FIG. 7 is a side view of the invention showing the invention attached to the rear portion of the trunk lid of a typical sedan for carrying bicycles and the like, the sedan being shown in phantom; and FIG. 8 is a perspective view of the invention showing it attached to the rear door at the window opening of a typical station wagon shown in phantom, but attached upside down compared to that shown in FIG. 3, for carrying heavy bicycles and the like such as the so-called motorized "mini-bike".

Figure 1:
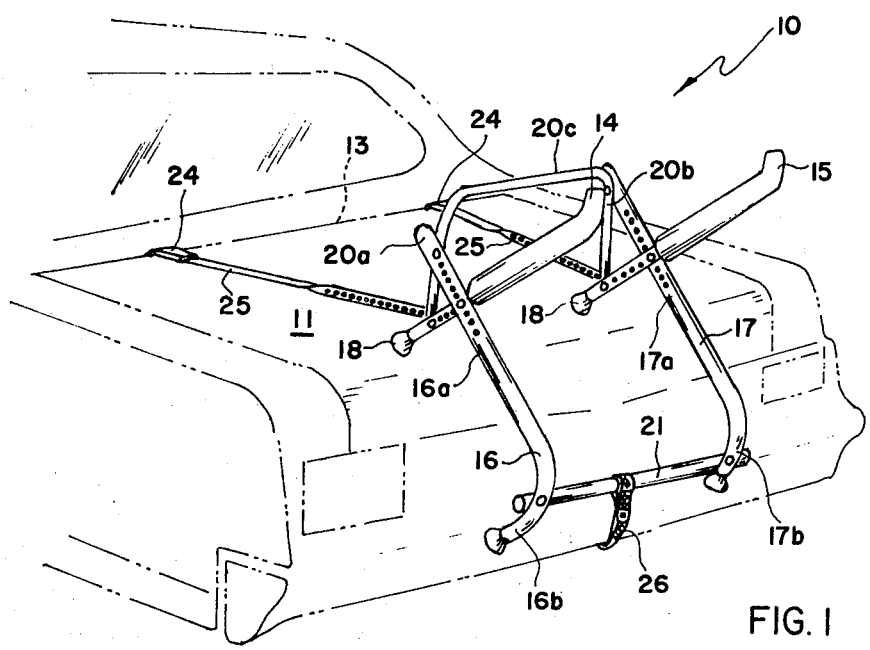
FIG. 1 is a perspective view of the invention showing its relation to a typical sedan, the sedan being shown in phantom.
Figure 5:
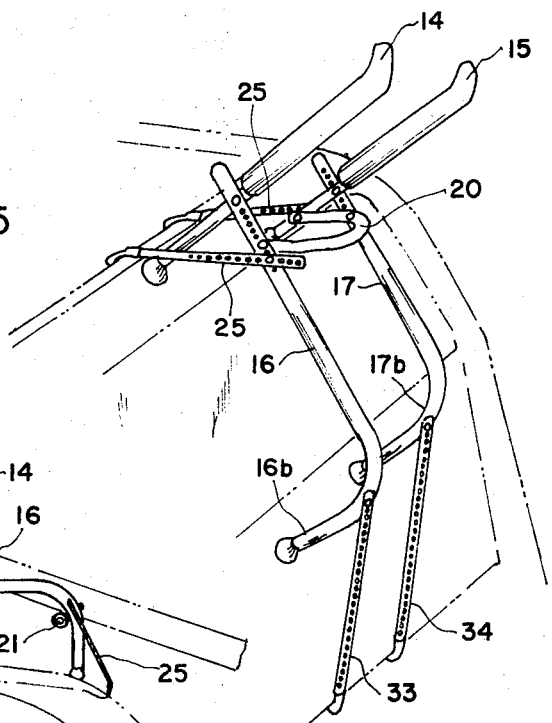
FIG. 5 is a perspective view of the invention showing it attached to the narrow top edge of a vehicle rear door, the vehicle being shown in phantom.

Directing attention now to FIG. 1, the carrier generally indicated by the number 10 is shown mounted on a typical American sedan (shown in phantom) having a generally flat trunk lid 11 forward of a generally vertical portion 12 including a rear bumper. Such trunk lids (and engine compartment lids where appropriate) are hinged at their forward edge 13. As will be more fully pointed out hereinafter, easily attachable and removable installation of carriers in accordance with the invention typically require only the presence of a horizontal edge or the like which a hook comprising part of hold-down means may engage. As shown in FIG. 1, the carrier comprises elongated carrying members 14 and 15 adapted for connection intermediate their ends to first and second substantially L-shaped side members 16 and 17. The carrying members 14 and 15 typically may be formed of elongated sections of pipe or the like having protective plastic or rubber caps 18 covering their ends adapted to contact the vehicle. The portions of the carrying members 14 and 15 distal from the protective caps may be each covered with a section of suitable plastic tubing or the like. Each side member 16 and 17 is comprised of first leg portions 16a and 17a and second leg portions 16b and 17b to define substantially L-shape. For convenience, simplicity, and economy, the side members 16 and 17 may be formed from hollow metal pipe and bending it to substantially the shape as shown in FIG. 1. The first leg portions 16a and 17a of the side members distal from the second leg portions 16b and 17b are preferably provided with a series of bolt holes to permit the attachment of the carrying members 14 and 15 and spacer means 20 at different points along the length of the first leg portions 16a and 17a. The spacer means 20 is preferably U-shaped as shown and adapted for connection as by bolts or the like to the carrying members 14 and 15 and the side members 16 and 17 substantially as shown. The spacer means 20 is preferably comprised of leg portions 20a and 20b adapted for connection to the carrying members and side members and integral with a cross portion 20c to define the substantially U-shape. Each carrying member may conveniently be connected to its respective side member as by bolts and the like. Similarly, the remote ends of the leg portions 20a and 20b of the spacer means may be connected to respectively carrying members 14 and 15 adjacent the caps 18 as by bolts or the like. For the embodiment shown in FIG. 1, the spacer means 20 is most conveniently integral and connected at about the bights thereof adjacent the ends of the first leg portions 16a and 17a of the side members by the use of bolts bent to define an obtuse angle; because the connection of the spacer means to the side members generally may be most conveniently made at the curved portions or bights of the spacer means, use of straight bolts at these points would require drilling of the parts in such a way that alternative construction of the carrier such as shown in FIG. 5 would be difficult if not impossible. Adapted for connection as by bolts or the like to the second leg portions 16b and 17b of the side members is a second spacer means 21 which may comprise a straight elongated tubular member.

An alternate arrangement of the spacer means 20 and the carrying members 14 and 15 by effectively inverting the positions of the carrying members 14 and 15 and the spacer means 20 as shown in FIG. 5 effectively increases the longitudinal distance between carrying members 14 and 15 and the leg portions 16b and 17b such that the carrier will span across a large rear window or other body shape as compared to the arrangement shown in FIG. 1, thereby providing added distance between the two pairs of feet of the carrier. The optimum fixed distance between these two pairs of feet that contact the vehicle (the extreme ends of carrier members 14 and 15 and leg portions 16b and 17b) such that the carrier will fit most vehicles is in the range from 14 to 22 inches. The option of being able to simply and quickly increase this dimension by approximately 6 inches permits the carrier to be used on any vehicle for substantially any purpose.

A carrier in accordance with the present invention may, of course, be permanently attached as by any suitable means to a vehicle. However, to provide a simply and conveniently installed and removable carrier, two or more hold down or attachment means each comprising a hook and a strap attachable to the carrier may be used. Attachment means for connection to the upper portion of a vehicle such as at the window opening, door, trunk lid or the like may be expected to carry the majority of the weight and, hence, while not necessarily limited thereto, may be conveniently formed of suitable rigid hooks 24 attached to elongated bendable metal straps 25 having a plurality of spaced holes along their length as shown. With such an arrangement, while providing more than ample strength, the attachment means may be simply and conveniently attached by the hooks to any available edge (such as edge 13) on a vehicle, the strap bent as required and adjustably attached to the carrier at a bolt connection. After attachment to the carrier, at, for example, the bolt connection between the spacer means 20 and the carrying members, any excess portion of the straps may be simply bent over or cut off. A carrier assembled as shown, for example, in FIG. 1 may be simply and conveniently attached to a vehicle by locating the carrier approximately at the position desired, attaching the upper attachment means to an edge of the vehicle and to the carrier, and then adjustably attaching a lower attachment means 26 comprising, for example, a web strap attached to a hook to both the carrier and a lower rear edge of the vehicle. The hook may engage the lower door edge or bumper and the web strap tightened to firmly attach the carrier to the vehicle.

Figure 2A:
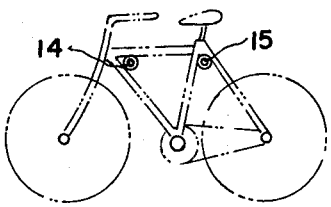
FIGS. 2a and 2b are planar views illustrating how a man's or a woman's bicycle may be carried.
Figure 2B:
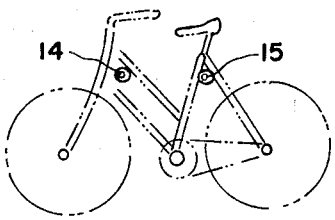

FIG. 2a illustrates the manner in which a man's bicycle may be typically supported on the carrying members 14 and 15; and FIG. 2b illustrates the manner in which a woman's bicycle may be typically supported on the carrying members 14 and 15.

The outwardly extending portions of the carrying members may be covered with plastic or padded to prevent scratching. The extreme ends of the carrying members as well as the extreme ends of the second leg portions of the side members which rest against the vehicle must, of course, be suitably padded as by rubber or plastic caps and the like to prevent damage to the vehicle.

FIG. 3 illustrates by way of example how a carrier substantially as shown in FIG. 1 may be simply, conveniently and quickly attached to the rear of a typical American station wagon such as those not provided with a metal window frame, by attaching the hooks 25 to the rear door at the lower edge 27 of the window opening, the second leg portions of the side members resting on the lower portion of the door, and the lower attachment means 26 being attached via its hook to the bottom edge of the door. With this type of arrangement, it will be evident that the rear door of the station wagon may be still opened in conventional manner even though the carrier is attached to it.

Figure 4:
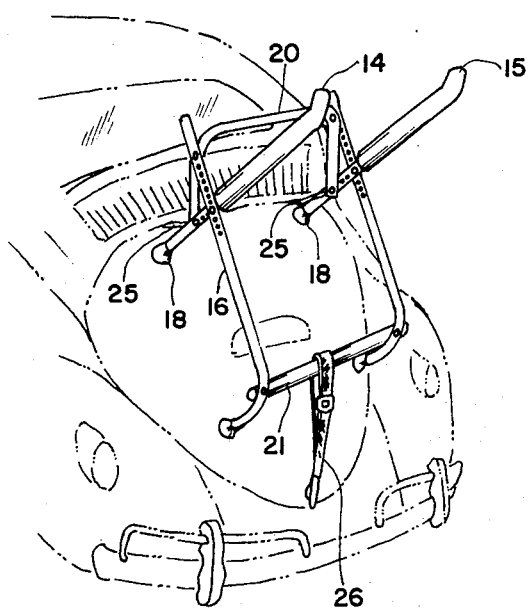
FIG. 4 is a perspective view of the invention showing it attached to a rear engine compartment lid typical of the present Volkswagon design.

FIG. 4 illustrates the manner in which a carrier in accordance with the invention may be simply and quickly attached to the engine compartment cover 30 typical of that on the small two-door vehicle presently manufactured by Volkswagon. It should be noted that the carrier can be attached to the engine compartment cover 30 and used in its usual manner without in any way restricting the rear view of the driver, taillights, license plate, or access to the engine.

FIG. 5 illustrates the manner in which a carrier in accordance with the present invention may be attached to a vehicle having a rear door with a metal window frame. For this particular application, it is important to note that the position of the U-shaped spacer means 20 is essentially reversed as compared to its position as shown in FIGS. 1, 3, and 4.

As will be evident from a comparison of FIGS. 4 and 5, the particular point at which the carrying members 14 and 15 are attached to the side members 16 and 17 and the particular points at which the U-shaped spacer means 20 is attached to the side members 16 and 17 and carrying members 14 and 15 is not critical and not may be varied, but should be variable to suit substantially any application. It is further significant to note that as shown in FIG. 5, the lower spacer means 21 shown in FIG. 4 has been omitted, attachment means 33 and 34 being connected to respectively the second leg portion 16b and 17b of the side members. Accordingly, it will now be evident that while the provision of a lower spacer member as shown, for example, in FIG. 4 is preferred, it is not essential.

Figure 6:
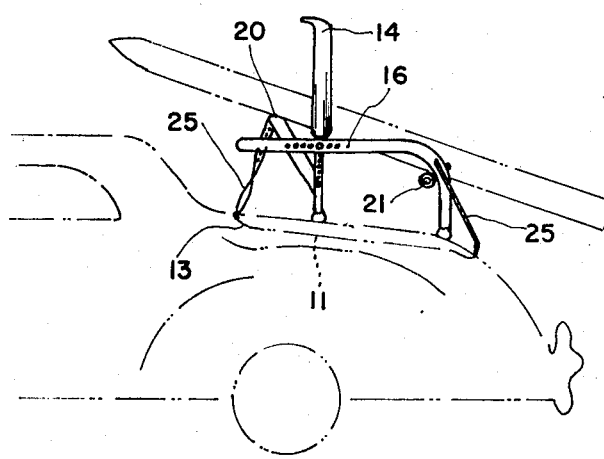
FIG. 6 is a side view of the invention showing it attached to the top of the trunk lid of a typical sedan for carrying skiis and the like, the sedan and skiis being shown in phantom.

Attention is not directed to FIG. 6 which illustrates how a carrier in accordance with the present invention may be attached to the substantially horizontal surface of a trunk lid 11 of an American sedan for carrying skiis and the like. It should be noted that in this particular case, a single attachment means connected to the U-shaped spacer means 20 is provided rather than two such connecting means as shown for example in FIG. 1. Any number of pairs of skiis depending on the width of the carrier may be carried in conventional manner by the provision of conventional attachment posts on the upper and lower spacer means 20 and 21.

FIG. 7 illustrates the carrier in position for carrying bicycles and the like.

Particular attention is directed to FIG. 8 which shows the carrier mounted on the rear portion of a station wagon, but inverted as compared to that shown for example in FIG. 1. The position and arrangement as shown in FIG. 8 is particularly advantageous for carrying luggage and relatively heavy motorized bicycles such as "mini-bikes" and the like. With the carrier in inverted position as shown in FIG. 8, relatively heavy articles such as "mini-bikes" and the like may be more easily loaded and carried than if the rack is in the position as shown for example in FIG. 1.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. In a carrier for an automobile or the like, the combination comprising:
   a. first and second substantially L-shaped side members, each said side member comprising first and second leg portions to define said substantially L-shape;
   b. first and second elongated carrying members, each said carrying member being adapted for connection intermediate its ends to a different one of said first leg portions intermediate their ends said carrying members extending in a direction substantially opposite to that of said second leg portions; and
   c. first cross means adapted for connection to said first leg portions and said carrying members.

2. The combination as defined in claim 1 wherein said cross means includes
   a. third and fourth leg members adapted for connection to said first leg portions and said carrying means and
   b. a cross piece for maintaining said side members in spaced relationship.

3. The combination as defined in claim 2 wherein said third and fourth leg members are adapted for connection adjacent their ends.

4. The combination as defined in claim 3 wherein said third and fourth leg members are disposed at an angle to said carrying members and said side members when connected thereto.

5. The combination as defined in claim 1 wherein said cross means has a substantially U-shape.

6. The combination as defined in claim 5 wherein said U-shaped cross means comprises third and fourth leg members integral with a cross piece, and said third and fourth leg members are adapted for connection adjacent their ends to said leg portions and said carrying members whereby said third and fourth leg members are disposed at an angle to said leg portions and said carrying members when attached thereto.

7. The combination as defined in claim 5 and additionally including second cross means adapted for connection adjacent its ends to said second leg portions.

8. The combination as defined in claim 2 and additionally including second cross means adapted for connection adjacent its ends to said second leg portions.

9. The combination as defined in claim 5 and additionally including hold down means for attaching said carrier to an automobile.

10. The combination as defined in claim 9 and additionally including means for connecting said carrying members, side members, and cross means to each other to define a substantially rigid carrier.

* * * * *